Patented Nov. 23, 1937

2,099,753

UNITED STATES PATENT OFFICE 2,099,753

MANUFACTURE OF CELLULOSE DERIVATIVES

Robert Pierce Roberts and Edgar Bertie Johnson, Spondon, near Derby, England, assignors to Celanese Corporation of America, a corporation of Delaware No Drawing. Application October 23, 1934, Serial No. 749,622. In Great Britain November 23, 1933

5 Claims. (Cl. 260—102)

This invention relates to the manufacture of cellulose acetates, and particularly to cellulose acetates having an improved resistance to delustering.

The manufacture of cellulose acetate is in general effected by reacting cellulose with a suitable acetylating agent in the presence of a catalyst and an inert medium until a product which is substantially cellulose triacetate is obtained, and then treating the product with water or other ripening agent to split off acetyl groups. The cellulose acetate thus obtained has a somewhat lower acetyl content, e. g. 52–54%, and filaments and other products obtained therefrom tend frequently to be delustred by treatment with hot water or other hot aqueous media.

The figures for the acetyl content given above and subsequently in the description and claims are calculated as acetic acid.

It has been discovered that cellulose acetates having an acetyl content of less than 56% and having an improved resistance to delustring as compared with cellulose acetates of similar acetyl content obtained in the normal manner may be obtained by regulating the proportion of ripening agent employed. Thus, cellulose acetates having acetyl contents of, for example, 55% down to 54% or 53% or even less may be obtained which are much less liable to delustring by hot aqueous media than are the commercial cellulose acetates of the same acetyl value which are obtained with the use of the normal proportions of ripening agent. This disvovery is, of course, of very great importance, since, in general, the reduction of the acetyl content of cellulose acetates below 56%, for example to 54% or somewhat less, improves their solubility in acetone or in the usual acetone-water or acetone-alcohol mixtures and thus facilitates their employment in the manufacture of industrial products, particularly artificial filaments and other extruded materials.

According to the present invention, therefore, cellulose acetates having an acetyl content of less than 56% which have an improved resistance to delustring are obtained by effecting the ripening of the cellulose acetate in the presence of a proportion of ripening agent less than that which is commonly employed, i. e. a proportion of less than 20% of the weight of the original cellulose.

The acetylation may be effected by any suitable method, but preferably it is carried out in in the presence of an inorganic acid containing oxygen or a derivative thereof and at temperatures below 40° C. The most suitable catalyst to employ is sulphuric acid, but other catalysts may also be used, as, for example, phosphoric acid or perchloric acid, a mixture of sulphuric and phosphoric acids, acid salts, e. g. bisulphates, mixtures of acids with salts or acid salts, e. g. a mixture of sulphuric acid and a bisulphate or of a perchlorate and an acid, or sulphuryl chloride.

Any suitable cellulosic materials may be employed, for example chemical wood pulps or cotton linters. Chemical wood pulps are preferably subjected to pretreatment with alkali as described in U. S. Patent No. 1,711,110. The cellulosic material may also be subjected to pretreatments with acidic reagents, for example with lower fatty acids as described in U. S. Patent No. 1,831,101 or 1,857,183, and in the case of wood pulps, such pretreatment may be applied in conjunction with the pretreatment with alkali as described in U. S. Patent No. 1,711,110. The pretreatment medium, e. g. acetic acid, may contain sulphuric acid or other catalyst and in this manner a uniform distribution of the catalyst throughout the cellulosic material may be obtained. In this connection reference is made to U. S. application S. No. 726,953 filed 22nd May, 1934.

Acetylation may be carried out so that the cellulose acetate is obtained either in solution or in suspension, and suitable methods of acetylation are described in U. S. Patents Nos. 1,278,885, 1,280,974, 1,280,975 and 1,708,787. Preferably the acetylating agent employed is acetic anhydride. Other acetylating agents may, however, be used as, for example, acetyl chloride.

The ripening operation is preferably effected with the cellulose acetate in solution in a suitable solvent, though the invention is not limited to such a process, and ripening may, if desired, be carried out with the cellulose acetate in suspension, either upon a cellulose acetate which has been obtained in suspension by carrying out the acetylation in the presence of non-solvent diluents, or upon a cellulose acetate which has been precipitated from solution and subsequently introduced into a non-solvent medium. When ripening in suspension is effected it is preferable that the non-solvent medium should be a solvent for the ripening agent employed (compare U. S. Patent No. 1,952,843).

As stated above, according to the present invention ripening is effected by means of a reduced amount of ripening agent, i. e. a proportion of less than 20% of the weight of the original cellulose. The proportions are, of course, in addition to the quantity which may be required to eliminate excess acetylating agent.

A proportion of ripening agent as low as 10% of the weight of the original cellulose or even less may be employed, or a somewhat higher proportion, e. g. of the order of from 12–15% or 17% of its weight. Ripening is preferably effected so that a cellulose acetate having an acetyl content of about 53–54% is obtained. Thus, by ripening a cellulose acetate obtained by the acetylation of cellulose in the presence of sulphuric acid as catalyst, using acetic anhydride as acetylating agent, and acetic acid as solvent and using an amount of water equivalent to 15% of the original weight of the cellulose as ripening agent, a cellulose having an acetyl value of 53–54% may be obtained which has a substantially increased resistance to delustering as compared with a cellulose acetate obtained under similar conditions but employing 20–24% of water for ripening.

The ripening operation may be carried out in a single stage or in more than one stage, for example by the addition of sufficient water or other reagent to destroy excess acetylating agent, allowing the mixture to stand for some time and then adding the desired proportion of ripening agent either in a single stage or in more than one stage. Again, the ripening may be effected in the presence of the whole of the catalyst employed for the acetylation process or further catalyst may be added, or preferably, in the case when an acid is employed as catalyst, a proportion of the acid is neutralized before or during ripening and ripening is effected or completed in the presence of a reduced proportion of acid. Thus, when sulphuric acid is used, sufficient sodium acetate, sodium carbonate or other substance may be incorporated with the medium to convert a proportion of the sulphuric acid, for example $\frac{1}{10}$ to $\frac{1}{3}$, and preferably about $\frac{1}{8}$, to bisulphate.

While the ripening operation may be carried out upon a cellulose acetate either in solution or in suspension and may, if desired, be effected as a process separate from that of the acetylation itself, preferably ripening is effected with the cellulose acetate in solution and continuously with the acetylation process.

After conversion to the required acetone-soluble cellulose acetate the cellulose acetate, if in solution, may be precipitated in any suitable manner, for instance by the addition of a large amount of water, preferably in the form of dilute acetic acid. A cellulose acetate in a finely granular form which is very easily washed and re-dissolved may be obtained by carrying out the precipitation process in two stages as described in U. S. application S. No. 648,980 filed 27th December, 1932. Stabilization may be effected in the usual manner, and if it is carried out under such conditions that a decrease in the acetyl content results, then the ripening stage of the manufacture according to the present invention should be interrupted at a point when the cellulose acetate has a correspondingly higher acetyl content than is desired in the final product.

The following example is given in order to illustrate the invention, but it does not limit it in any way:—

*Example*

100 parts of cotton linters are acetylated by means of about 400 parts of acetic anhydride and 10 to 15 parts of sulphuric acid in the presence of about 400 parts of glacial acetic acid. When the reaction is complete sufficient water is added to react with the residual acetic anhydride and to provide an excess equal to about 10% of the weight of the cotton linters. Ripening is allowed to proceed until an acetone-soluble cellulose acetate having an acetyl value of about 53% calculated as acetic acid is obtained, at which point the product precipitated from solution, washed and dried.

When the cellulose acetate thus obtained is spun into yarn in the usual manner, the yarn produced has an increased resistance to the delustring action of hot soap solution as compared with the yarn obtained from a cellulose acetate of the same acetyl content produced in a similar manner but ripened with larger amounts of water, for example 20 to 24%. The delustring process consists in subjecting the yarn to the action of a .25% soap solution at the boiling point for 1 hour followed by washing with water.

The cellulose acetates obtained according to the present invention may be employed for any industrial purposes, but they are, of course, of particular value in the manufacture of products in which resistance to the delustring action of hot aqueous media is required, for example of filaments, yarns, horsehair, bristles and similar materials. In addition they may be employed in the manufacture of films for photographic or other purposes, lacquers for coating or other purposes, and any other industrial products. Further, they may be employed in the production of mixed yarns, filaments and other products.

What we claim and desire to secure by Letters Patent is:—

1. Process for the manufacture of cellulose acetate, which comprises ripening cellulose acetate by incorporating with an acetylation solution of cellulosic material and containing acetic anhydride and an acid catalyst sufficient reagent to destroy excess acetylating agent, allowing the mixture to stand for some time, neutralizing a part of the acid catalyst and incorporating a ripening agent in a proportion of less than 20% of the cellulosic material and continuing ripening until an acetone soluble cellulose acetate having an acetyl content of less than 56% is produced, the conditions of treatment being such that the cellulose acetate produced is capable of being formed into products of increased resistance to the delustering action of hot aqueous solutions.

2. Process for the manufacture of cellulose acetate, which comprises ripening cellulose acetate by incorporating with an acetylation solution of cellulosic material and containing acetic anhydride and an acid catalyst sufficient reagent to destroy excess acetylating agent, partially neutralizing the acid catalyst, allowing the mixture to stand for some time, and then incorporating a ripening medium containing water as ripening agent in a proportion of less than 20% of the cellulosic material and continuing ripening until an acetone soluble cellulose acetate having an acetyl content of less than 56% is produced, the conditions of treatment being such that the cellulose acetate produced is capable of being formed into products of increased resistance to the delustering action of hot aqueous solutions.

3. Process for the manufacture of cellulose acetate, which comprises ripening cellulose acetate by incorporating with an acetylation solution, containing acetic anhydride, sufficient reagent to destroy excess acetic anyhdride, allowing the mixture to stand for some time, and then incorporating a ripening medium containing water as ripening agent in a proportion of 10 to 17% of the original weight of the cellulosic material and continuing ripening until a cellulose acetate having an acetyl content of 53 to 56% is produced, the conditions of treatment being such that the cellulose acetate produced is capable of being formed into products of increased resistance to the delustering action of hot aqueous solutions.

4. Process for the manufacture of cellulose acetate, which comprises ripening cellulose acetate by incorporating with an acetylation solution, containing acetic anhydride, sufficient reagent to destroy excess acetic anhydride, allowing the mixture to stand for some time, and then incorporating a ripening medium containing water as ripening agent in a proportion of 12 to 17% of the original weight of the cellulosic material and continuing ripening until a cellulose acetate having an acetyl content of 52 to 54% is produced, the conditions of treatment being such that the cellulose acetate produced is capable of being formed into products of increased resistance to the delustering action of hot aqueous solutions.

5. Process for the manufacture of cellulose acetate, which comprises acetylating cellulosic material in the presence of acetic anhydride and of an inorganic acid containing oxygen as acetylation catalyst at a temperature not greater than 40° C., incorporating with the acetylation solution sufficient reagent to destroy excess acetic anhydride, allowing the mixture to stand for some time, and then incorporating a ripening medium containing water as ripening agent in a proportion of less than 20% of the cellulosic material and continuing ripening until a cellulose acetate having an acetyl content of 53 to 56% is produced, the conditions of treatment being such that the cellulose acetate produced is capable of being formed into products of increased resistance to the delustering action of hot aqueous solutions.

ROBERT PIERCE ROBERTS.
EDGAR BERTIE JOHNSON.